United States Patent
Symanow

(10) Patent No.: US 10,252,622 B2
(45) Date of Patent: *Apr. 9, 2019

(54) LOW CHARGE ACCEPTANCE MITIGATION

(71) Applicant: Ford Global Technologies, LLC, Dearborn, MI (US)

(72) Inventor: David Anthony Symanow, Plymouth, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 225 days.

This patent is subject to a terminal disclaimer.

(21) Appl. No.: 15/292,183

(22) Filed: Oct. 13, 2016

(65) Prior Publication Data

US 2018/0105046 A1    Apr. 19, 2018

(51) Int. Cl.
*H02J 7/00* (2006.01)
*H02J 7/14* (2006.01)
*B60L 11/02* (2006.01)
*B60L 11/18* (2006.01)

(52) U.S. Cl.
CPC .......... *B60L 11/02* (2013.01); *B60L 11/1816* (2013.01); *B60L 11/1862* (2013.01); *H02J 7/00* (2013.01); *H02J 7/0075* (2013.01); *B60L 2210/12* (2013.01); *Y10S 903/903* (2013.01)

(58) Field of Classification Search
USPC ....... 320/100, 107, 109, 129, 131, 139, 156, 320/160, 163; 701/22
See application file for complete search history.

(56) References Cited

U.S. PATENT DOCUMENTS

| 5,648,714 A * | 7/1997 | Eryou ............... H02J 7/0093 320/139 |
| 6,037,751 A | 3/2000 | Klang |
| 2007/0031725 A1* | 2/2007 | Schulze-Beckinghausen ............ H01M 10/4285 429/65 |
| 2010/0117604 A1* | 5/2010 | Zeier ............... H01M 10/06 320/166 |
| 2011/0082621 A1* | 4/2011 | Berkobin ............ B60L 11/1824 701/31.4 |
| 2013/0054072 A1 | 2/2013 | Christen et al. |
| 2014/0225555 A1* | 8/2014 | Biggs ............... H02J 7/14 320/107 |
| 2016/0059716 A1 | 3/2016 | Gale et al. |
| 2016/0084916 A1* | 3/2016 | Kim .................. G01R 31/3675 324/431 |
| 2016/0332533 A1* | 11/2016 | Tistle ............... B60L 11/1872 |
| 2017/0160349 A1* | 6/2017 | Iida ................. G01R 31/36 |

FOREIGN PATENT DOCUMENTS

FR           2977325 A1    1/2013

* cited by examiner

*Primary Examiner* — Alexis B Pacheco
(74) *Attorney, Agent, or Firm* — David Kelley; Brooks Kushman P.C.

(57) ABSTRACT

A vehicle may include a battery and a controller programmed to set a bus voltage threshold such that during a next charging event a voltage of the battery achieves a desulfation value. The controller may set the bus voltage threshold in response to charge acceptance of the battery falling below a predetermined sulfation value. The controller may be programmed to lower the threshold such that the voltage of the battery falls below the desulfation value. The controller may lower the threshold in response to the charge acceptance exceeding the predetermined sulfation value during the event.

17 Claims, 5 Drawing Sheets

LOW CHARGE ACCEPTANCE MITIGATION

TECHNICAL FIELD

The present disclosure relates to low charge acceptance mitigation of vehicle batteries.

BACKGROUND

Charge acceptance is the ratio between charge received by the battery over time and charge retained by the battery. Charge acceptance is synonymous with battery charging efficiency. Low charge acceptance can noticeably degrade fuel economy in hybrid and electric vehicles because more energy is required to maintain a battery state of charge (SOC). Batteries having low charge acceptance may also require longer charging periods. As such, low charge acceptance can cause unnecessary consumption of fossil fuels.

SUMMARY

A vehicle may include a battery and a controller programmed to set a bus voltage threshold such that during a next charging event a voltage of the battery achieves a desulfation value. The controller may set the bus voltage threshold in response to charge acceptance of the battery falling below a predetermined sulfation value. The controller may be programmed to lower the threshold such that the voltage of the battery falls below the desulfation value. The controller may lower the threshold in response to the charge acceptance exceeding the predetermined sulfation value during the event.

A vehicle may include a battery and a controller programmed to set a bus voltage threshold such that during a next charging event a voltage of the battery achieves a destratification value. The controller may set the bus voltage threshold in response to charge acceptance of the battery falling below a predetermined stratification value. The controller may be programmed to lower the threshold such that the voltage of the battery falls below the destratification value. The controller may lower the threshold in response to the charge acceptance exceeding the predetermined stratification value during the event.

A vehicle may include a battery, an electric machine, and a controller programmed to set a bus voltage threshold such that during a next charging event a voltage of the battery achieves a destratification value. The controller may set the bus voltage threshold in response to charge acceptance of the battery falling below a predetermined stratification value. The controller may be programmed to lower the threshold such that the voltage of the battery falls below the destratification value. The controller may lower the threshold in response to the charge acceptance exceeding the predetermined stratification value during the event.

DETAILED DESCRIPTION

Figure 1:
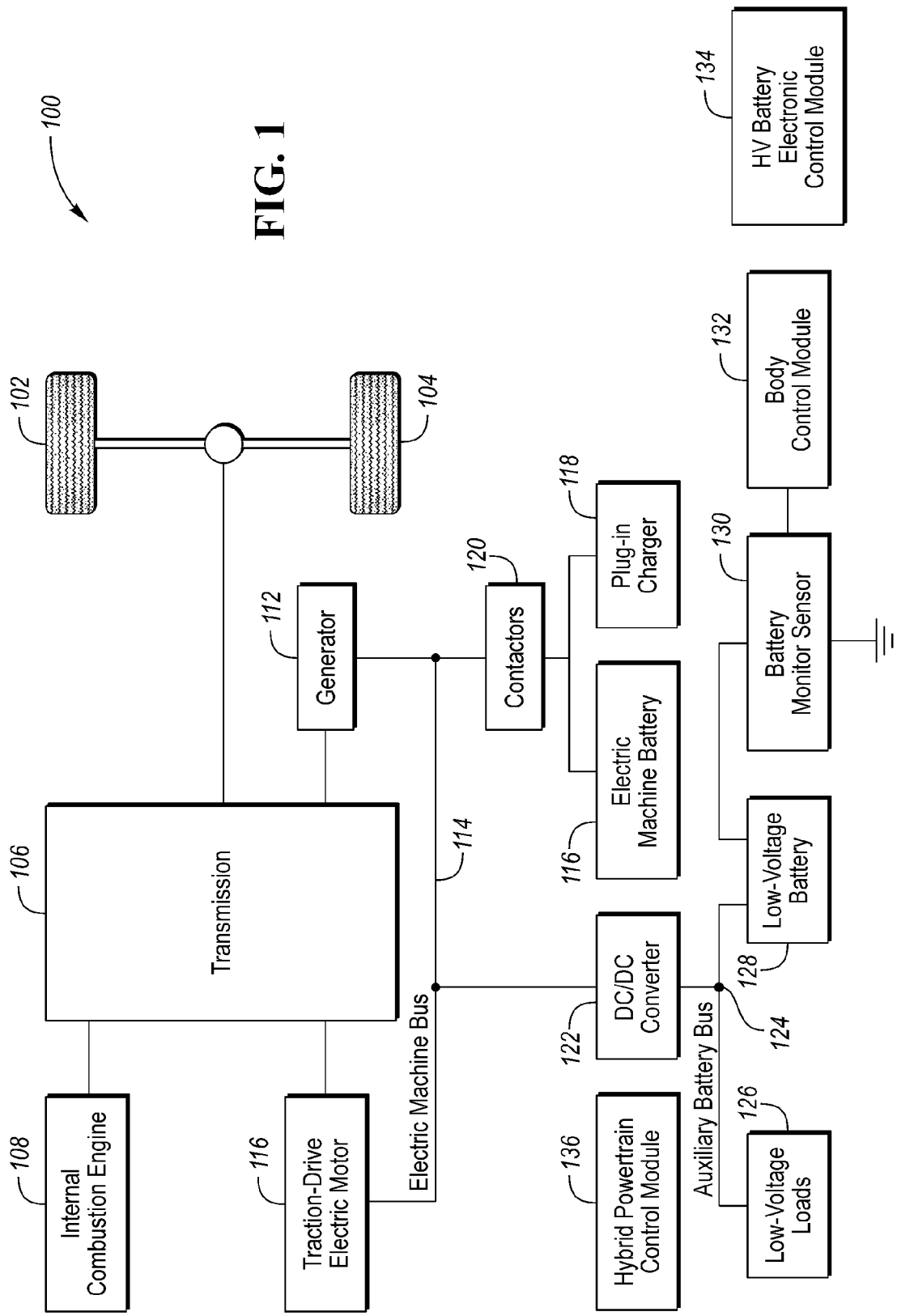
FIG. 1 is a vehicle overview of a typical hybrid vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include a variety of battery systems to provide electricity on demand. Hybrid vehicles may include auxiliary batteries to provide power to auxiliary loads. A 12-volt bus, commonly found on most contemporary vehicles, may supply power to the auxiliary loads (e.g., electronics, defrost, temperature conditioning of seats). The 12-volt bus, however, may be configured as other voltages capable of supplying auxiliary loads. The auxiliary battery is typically a 12-volt, lead-acid battery. Any battery type is contemplated in this disclosure (e.g., Lithium, Nickel, Lead). The battery may be formed from lead-acid cells because lead-acid cells have a propensity for sulfation and stratification, which may lead to low charge acceptance.

Lead-acid batteries in motor vehicles may have six individual cells, each being capable of generating about two volts. Structuring the cells in series produces a 12-volt power source. The 12-volt power source may be collectively charged at a higher voltage between 13 and 14 volts. Higher charging voltages may cause off-gassing, which is a release of hydrogen from the battery. Off-gassing may reduce battery longevity.

Sulfation develops when a lead-acid battery is deprived of full charge. Sulfate crystals may form on the plates of each cell reducing the cell's active material. The reduction in active material reduces the charge acceptance of the battery. Sulfation can be corrected by increasing the charging voltage of a 12-volt battery bus to about 15.5 volts, resulting in each cell of the battery being charged near 2.58 volts. The increase in voltage may dissolve a substantial portion of the sulfate crystals. Sulfation may be recognized when the charge acceptance is between 25-50%, independent of temperature effects.

Stratification develops when the electrolyte of a battery is unevenly distributed to particular sectors of the battery. For example, the electrolyte may concentrate in the bottom of the battery cell, inhibiting the batteries ability to accept and store charge. Batteries may be destratified by applying a higher charging voltage to the battery bus. The higher voltage mixes the electrolyte through electrolysis. For example, a 12-volt battery may be charged near 16 volts, resulting in each cell being charged near 2.66 volts. Stratification may be determined when the charge acceptance is a fraction of a percent, independent of temperature effects.

Low charge acceptance may be caused by battery temperature. Low temperature ambient conditions may cause the charge acceptance to drop. In some embodiments, temperature effects may be removed from charge acceptance calculations. In this way, the chemistry-based low charge acceptance effects and temperature-based low charge acceptance effects are isolated, providing mitigation of only chemistry related low charge acceptance. Temperature effects may be removed using a lookup table or other method. For example, a characteristic association may be tracked by the manufacturer over various temperatures. A lookup table may allow the control logic to increase the charge acceptance proportionately or by another factor to remove temperature effects.

Low charge acceptance mitigation may be performed to improve charging efficiency, which may lower charge cycle times and improve vehicle fuel economy. The mitigation technique may be performed on a recurring, scheduled basis. A vehicle controller may be configured to mitigate low charge acceptance every thirty or sixty days. Although effective, the scheduled mitigation technique may result in low charge acceptance being unrefuted for long periods. For this or other reasons, a vehicle controller may be programmed to recognize low charge acceptance and raise the vehicle bus voltage to address low charge acceptance upon the occurrence or shortly thereafter. The controller may calculate charge acceptance after every charging cycle or set of charge cycles to determine whether sulfation or stratification is present. The controller may set a flag to mitigate low charge acceptance on a subsequent charging cycle. The controller may also perform on-the-fly mitigation if the battery is not entirely charged and low charge acceptance is detected.

In some instances, the controller may be programmed to mitigate sulfation during an active or key-on vehicle mode. The controller may be programmed to mitigate stratification during an inactive or key-off vehicle event or mode. Fluctuations in bus voltage during vehicle operation may deem high bus voltages, such as those required for destratification, unavailable. Therefore, modern auxiliary bus configurations may impose maximum bus voltage thresholds to ensure proper function of the auxiliary loads.

Now referring to FIG. 1, a system diagram of a hybrid vehicle 100 is shown. A pair of wheels 102, 104 are attached to a transmission 106. The transmission 106 couples the driveshaft to an internal combustion engine 108, traction-drive electric motor 110, and a generator 112. In some embodiments, the motor 110 and generator 112 may be unitary. The motor 110 and generator 112 are electrically connected to an electric machine bus 114. The generator 112 may serve as a current source for recharging the traction battery 116 and the auxiliary battery 128. The electric machine bus 114 may connect the traction battery 116 and plug-in charger 118, which supply power to the electric machine bus 114, to the motor 110 and generator 112. The plug-in charger 118 may serve as a current source for recharging the traction battery 116 and the auxiliary battery 128. The traction battery 116 may have high voltage and current capabilities to provide and receive an electromotive force associated with the motor 110 and generator 112. The traction battery 116 may be any battery type. For example, the traction battery 116 may be a lithium-ion battery. The plug-in charger may serve as a connection point to a utility power grid. The plug-in charger 118 may also receive power from a wireless power source. For instance, a pair of coils may be inductively coupled to provide power to the traction battery 116 and electric machine bus 114. Supply current to the electric machine bus 114 may be disconnected through a set of contactors 120.

The electric machine bus 114 may be stepped down through an adjustable direct current to direct current (DC/DC) converter 122 to power the auxiliary bus 124. The DC/DC converter 122 may be any type of stepdown converter, including a buck converter. The converter may have a variable output voltage to accommodate normal charging voltages, desulfation voltages, and destratification voltages. The DC/DC converter 122 may be unable to dampen bus transients. For example, intermittent actuation of auxiliary loads attached to the auxiliary bus 124 may cause fluctuations in the auxiliary bus 124 voltage.

The auxiliary bus 124 may have a maximum voltage of 16 volts to protect auxiliary loads 126 and the auxiliary battery 128. The DC/DC converter 122 may be controlled using the hybrid powertrain control module 136 or another control module. The hybrid powertrain control module 136 may set the bus voltage threshold for the auxiliary bus 124. The bus voltage threshold may be below the maximum voltage of the auxiliary bus 124 to provide safety margin during transients. The transients may cause the auxiliary bus voltage to fluctuate above 16 volts due to lagging voltage increases used to offset transient loads.

Safety margin bus voltage limits may reduce the low charge acceptance mitigation techniques that require raising the auxiliary bus voltage. The safety margin limits may change based on vehicle operating conditions. For example, if the vehicle is in the key-off position, the auxiliary loads 126 may be disconnected from the auxiliary bus 124 or inhibited from actuation. The key-off position may reduce the transients associated with the auxiliary bus 124, allowing the safety margin to be decreased and the bus voltage threshold to be increased. As described herein, the bus voltage threshold may be increased above a destratification or desulfation threhold to mitigate low charge acceptance.

A controller or group of controllers 132, 134, 136 may be used to control the low charge acceptance mitigation event. The controllers 132, 134, 136 may have control logic implemented therein, input channels to receive control parameters, and output channels to transmit control parameters. The input channels or input signals may be configured to receive input from numerous sources and relate to various vehicle parameters. For instance, an input channel may receive bus voltage information, charge acceptance information, or system state information. The input channels may receive networked or digital data from the CAN bus or sensory data from digital inputs or analog inputs. The input channels may be any type of informational input received by any one or all of the controllers.

The output channels may output a variety of signals. The signals may be digital or networked signals to other controllers or systems. The output channels or signals may be digital or analog outputs used to control or operate other system parameters. The control logic may be configured to receive information from the input channels and facilitate proper output at the output channels. The control logic may be stored digitally in any type of storage memory (e.g., EEPROM, ROM, RAM). The control logic may also use an arrangement of logic gates (e.g., relay logic, TTL, ladder logic). The control logic may be embedded in a single controller or grouping of controllers depending on the location of the input channels and output channels.

Figure 2:
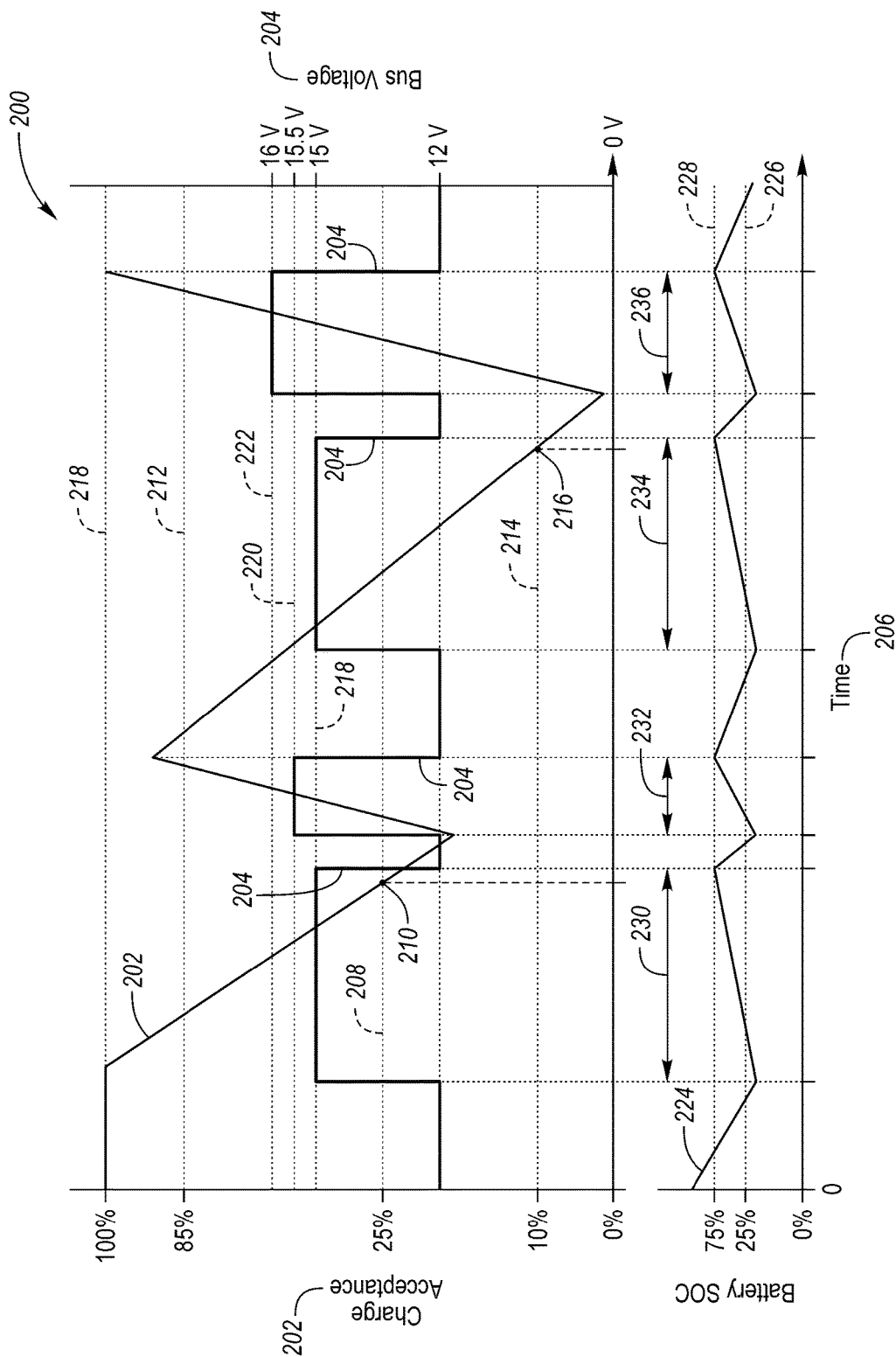
FIG. 2 is a graph depicting a low charge mitigation scheme.

Now referring to FIG. 2, a graph 200 depicting a low charge acceptance scheme is shown. The graph 200 includes a charge acceptance curve 202 having varying levels of charge acceptance. The graph 200 includes a bus voltage curve 204 with associated bus voltage thresholds 218, 220, 222. The graph 200 includes a time varying battery state of charge (SOC) 224 having a charge-required threshold 226 and a stop-charging threshold 228. The thresholds depicted in this graph may be changed, replaced, or overlap with different numerical values or names. Starting from the left, the charge acceptance 202 of the auxiliary battery is 100%. As the battery SOC 224 drops below the charge-required threshold 226, the controller may begin to charge the auxiliary battery through the DC/DC converter. The charge acceptance 202 of the auxiliary battery may begin to drop as the first charging event 230 transpires. The first charging event 230 has a normal bus voltage threshold 218. The charge acceptance 202 falls below the sulfication threshold 208, a low charge acceptance flag may be set at point 210. During the next, second charge event 232, the bus voltage 204 may be raised to a desulfation threshold 220. The desulfation threshold 220 may ensure that desulfation of the auxiliary battery occurs. The charge acceptance 202 may begin to drop below the stratification threshold 214 during the third charging event 234. A low charge acceptance flag may be set at point 216. During the next second charge event 232, the bus voltage 204 may be raised to a destratification threshold 222. During the destratification charging event, the bus voltage 204 is raised to almost 16 volts to ensure destratification occurs.

Although shown as reaching a particular charge acceptance value, the destratification or desulfation thresholds 212, 218 may have varying magnitudes to meet implementation needs, or in at least one embodiment, the destratification and desulfation thresholds 212, 218 may be the same. For example, the thresholds to enable destratification and desulfation may be different and the thresholds 212, 218 to disable destratification and desulfation may be the same or vice versa. Although shown as having a constant voltage throughout the destratification and desulfation charge events 232, 236, the bus voltage of the charging event may be adjusted as soon as the destratification or desulfation threshold 212, 218 is obtained. For example, the destratification charge acceptance threshold 218 may be reached before the battery SOC 224 has reached the charge threshold 228. The DC/DC converter controller may then reduce the bus voltage to prevent over-voltage charging of the battery. The graph 200 may not be to scale. The charging events 230, 232, 234, and 236 may have various durations and more discharge time may be typical.

Figure 3A:
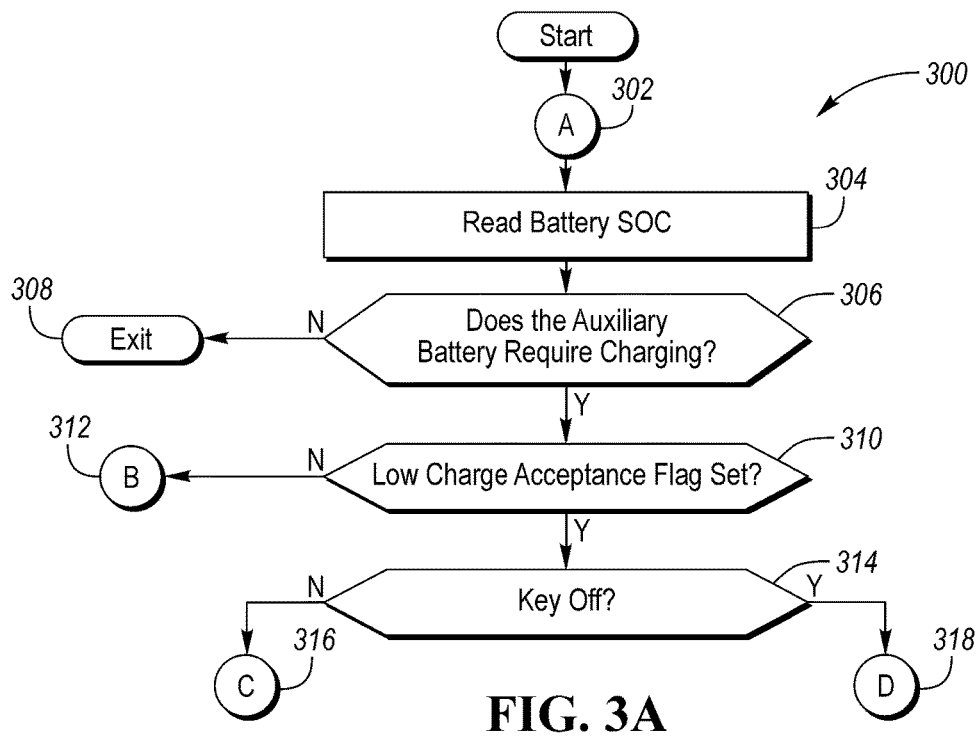
FIG. 3A is a flow diagram of a portion of a low charge acceptance mitigation scheme.

Now referring to FIG. 3A, a portion of a flow diagram 300 is depicted. In step 302, the control scheme begins with subroutine A. In step 304, the controller may read the battery SOC from the battery monitoring system. In step 306, the controller determines whether the auxiliary battery requires charging. The determination in step 306 may be based on an SOC of the battery. If the battery SOC is above a recharging threshold, the algorithm exits in step 308. In step 310, if the low charge acceptance flag is not set, the algorithm may proceed to subroutine B 312. If the low charge acceptance flag is set, the algorithm may proceed to another decision point in step 314. In step 314, if the vehicle is in key-off status, the algorithm may advance to subroutine D 318. If the vehicle is not in key-off status, the algorithm may advance to subroutine C 316.

Figure 3B:
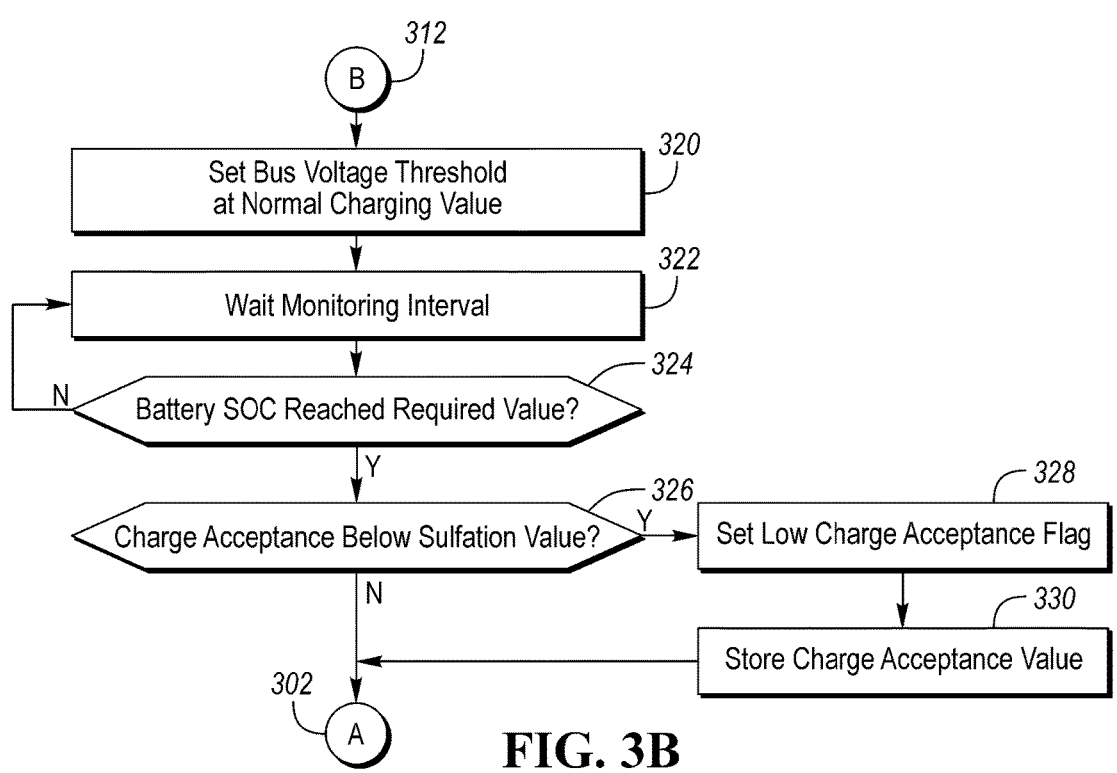
FIG. 3B is a flow diagram of a portion of a low charge acceptance mitigation scheme having a normal charging value.

Now referring to FIG. 3B, a portion of a flow diagram is depicted. Continuing from step 312, in step 320 the controller may set the bus voltage threshold at a normal charging value. A normal charging value may be above the battery output voltage. For example, a 12-volt battery may have a normal recharging bus voltage threshold of 13, 14, or 15 volts. In step 322, the controller may pause or wait for a monitoring interval. In step 324, the controller checks the battery SOC to determine whether the SOC has risen above a full charge threshold. After the battery SOC reaches the threshold, the controller performs a charge acceptance determination in step 326. The charge acceptance determination may be based on various methodologies. The charge acceptance methodology may include calculating an SOC of the battery. The SOC calculation may be based on various battery parameters (e.g., internal resistance, open-circuit voltage, age, charge-discharge cycles). Coulomb counting may be used to determine the amount of charge sent to the battery over time. The charge may be integrated over time or aggregated to determine the total amount of charge sent to the battery. The ratio of sent and received charge may be calculated from the change in SOC and the integrated charge. Based on the ratio between applied current and battery SOC, a charge acceptance may be calculated. In step 326, a low charge acceptance determination may be performed based on a calculated charge acceptance. If the charge acceptance is below the sulfation value, a low charge acceptance flag may be set in step 328. A charge acceptance value below 50% may indicate detrimental sulfation. The sulfation charge acceptance value may be adjusted to balance battery longevity and fuel economy. The controller may store the charge acceptance value for use in step 330. The process then returns to subroutine A 302.

Figure 3C:
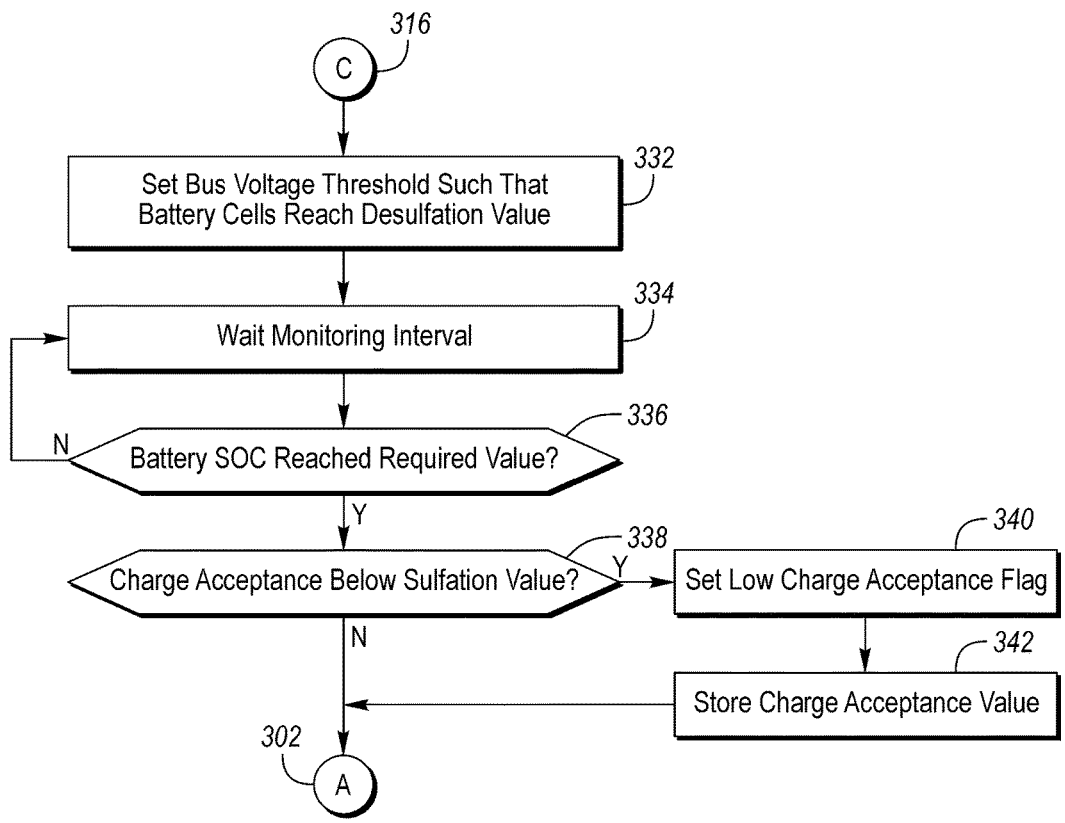
FIG. 3C is a flow diagram of a portion of a low charge acceptance mitigation scheme having a desulfation charging value.

Now referring to FIG. 3C, a portion of a flow diagram is depicted. Continuing from step 316, in step 332 the controller may set the bus voltage threshold such that the battery cells achieve a desulfation value. For example, the required bus voltage for desulfation may be 15.5 V. In other embodiments, the desulfation bus voltage may be higher or lower. The controller may begin charging, and in step 334, the controller may pause or wait for a monitoring interval. In step 336, the controller checks the battery SOC to determine whether the SOC has risen above a full charge threshold. After the battery SOC reaches the threshold, the controller performs a charge acceptance determination in step 338. As stated above, the charge acceptance determination may be based on various methodologies. Based on the charge acceptance, step 338 may be performed. If the charge acceptance is below the sulfation value, a low charge acceptance flag may be set in step 340. A charge acceptance value below 50% may indicate detrimental sulfation. The sulfation charge acceptance value may be adjusted to balance battery longevity and fuel economy. The controller may store the charge acceptance value for later use in step 342. The process then returns to subroutine A 302.

Figure 3D:
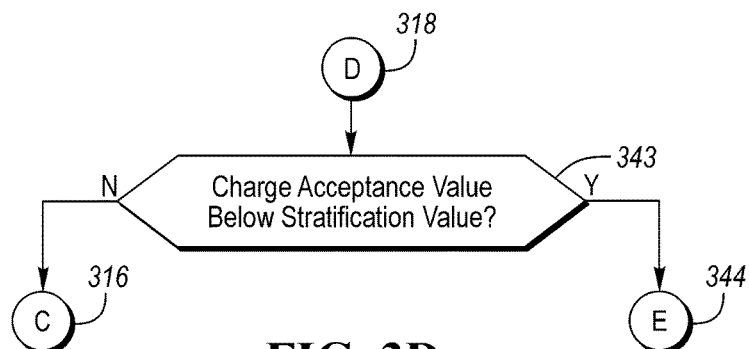
FIG. 3D is a flow diagram of a portion of a low charge acceptance mitigation scheme for a plug-in vehicle.

Now referring to FIG. 3D, a portion of a flow diagram is depicted. In step 318, the vehicle may be in a key-off state and receiving power from an outlet or plug. If the charge acceptance is below the stratification value, in step 343, the controller may proceed to subroutine E 344. Otherwise, the controller may proceed to subroutine C 316. The stratification value, of step 343, may equal a charge acceptance less than 1% of the rated charge acceptance. The stratification value, along with the sulfation value, may be battery dependent and circuit dependent.

Figure 3E:
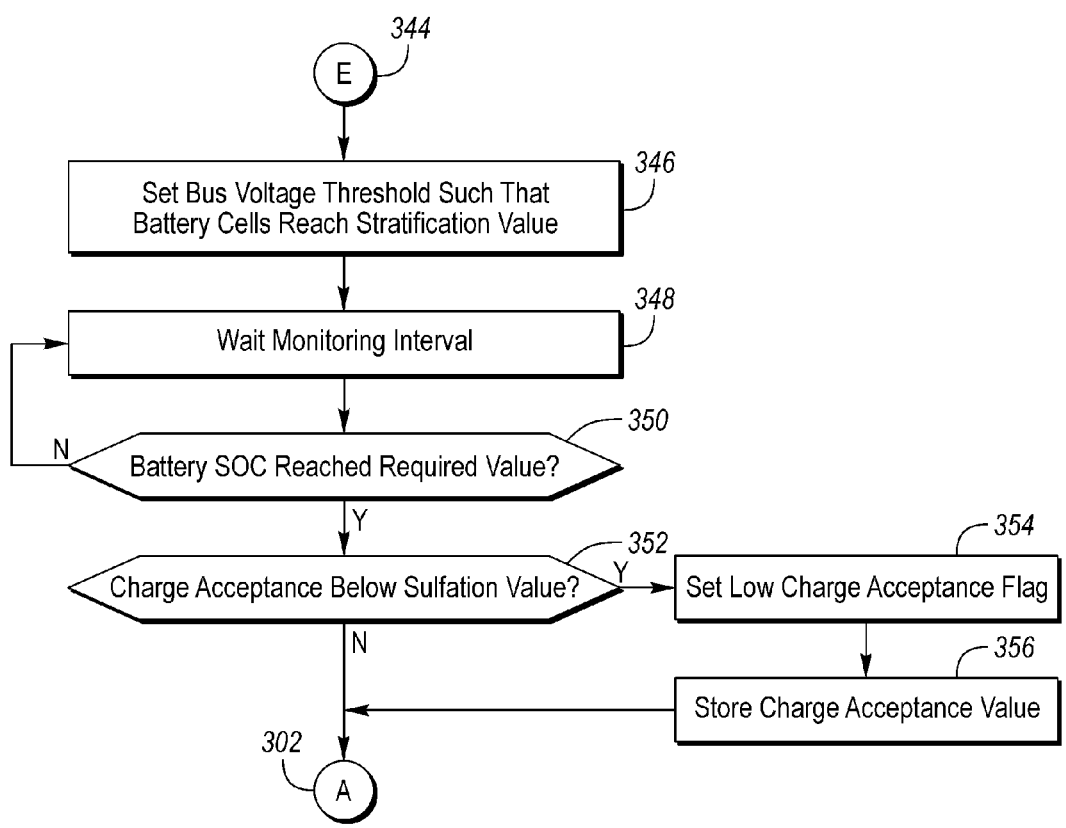
FIG. 3E is a flow diagram of a portion of a low charge acceptance mitigation scheme having a destratification charging value.

Now referring to FIG. 3E, a portion of a flow diagram is depicted. In step 346 the controller may set the bus voltage threshold such that the battery cells achieve a destratification value. For example, the required bus voltage for destratification may be 15.9 V. In other embodiments, the destratification bus voltage may be higher or lower. The controller may begin charging, and the controller may pause or wait for a monitoring interval in step 348. In step 350, the controller checks the battery SOC to determine whether the SOC has risen above a full charge threshold. After the battery SOC reaches the threshold, the controller performs a charge acceptance determination in step 352. As stated above, the charge acceptance determination may be based on various methodologies. Based on the charge acceptance, step 352 may be performed. If the charge acceptance is below the sulfation value a low charge acceptance flag may be set in step 354. A charge acceptance value below 50% may indicate detrimental sulfation. The sulfation charge acceptance value may be adjusted to balance battery longevity and fuel economy. The controller may store the charge acceptance value for later use in step 356. The process then returns to subroutine A 302.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a battery; and
   a controller programmed to,
      in response to charge acceptance of the battery falling below a predetermined sulfation value, set a bus voltage threshold such that during a next charging event a voltage of the battery achieves a desulfation value, and
      in response to the charge acceptance exceeding the predetermined sulfation value during the event, lower the threshold such that the voltage of the battery falls below the desulfation value.

2. The vehicle of claim 1, wherein the charge acceptance is based on a current output of an electric machine.

3. The vehicle of claim 1, wherein the controller is further programmed to, in response to the charge acceptance falling below a predetermined stratification value, set the bus voltage threshold such that during the next charging event the voltage of the battery achieves a destratification value, and in response to the charge acceptance exceeding the predetermined stratification value during the event, lower the threshold such that the voltage of the battery falls below the destratification value.

4. The vehicle of claim 3, wherein the event is a plug-in charging event.

5. The vehicle of claim 3, wherein the bus voltage threshold associated with the desulfation value is 15.5 volts.

6. The vehicle of claim 3, wherein the bus voltage threshold associated with the destratification value is 15.9 volts.

7. The vehicle of claim 1, wherein the charge acceptance is adjusted to be temperature independent.

8. A vehicle comprising:
   a battery; and
   a controller programmed to,
      in response to charge acceptance of the battery falling below a predetermined stratification value, set a bus voltage threshold such that during a next charging event a voltage of the battery achieves a destratification value, and
      in response to the charge acceptance exceeding the predetermined stratification value during the event, lower the threshold such that the voltage of the battery falls below the destratification value.

9. The vehicle of claim 8, wherein the bus voltage threshold associated with the destratification value is 15.9 volts.

10. The vehicle of claim 8, wherein the controller is further programmed to, in response to the charge acceptance falling below a predetermined sulfation value, set the bus voltage threshold such that during the next charging event the voltage of the battery achieves a desulfation value, and in response to the charge acceptance exceeding the predetermined sulfation value during the event, lower the threshold such that the voltage of the battery falls below the desulfation value.

11. The vehicle of claim 10, wherein the bus voltage threshold associated with the desulfation value is 15.5 volts.

12. The vehicle of claim 8, wherein the charge acceptance is based on a current output of an electric machine.

13. The vehicle of claim 8, wherein the event is a plug-in charging event.

14. A vehicle comprising:
   an electric machine;
   a battery electrically connected to the electric machine; and
   a controller programmed to, in response to indication of a charge acceptance of the battery falling below a first predetermined value indicative of sulfation, raise a bus voltage associated with the vehicle battery to a sulfation threshold during a charging event until the battery charge acceptance rises above the first predetermined value, and programmed to, in response to indication of the charge acceptance falling below a second predetermined value indicative of stratification, raise the bus voltage associated with the vehicle battery to a stratification threshold during the charging event until the battery charge acceptance rises above the second predetermined value.

15. The vehicle of claim 14, wherein the charge acceptance is based on a current output of an electric machine.

16. The vehicle of claim 15, wherein a power source for the charging event is the electric machine.

17. The vehicle of claim 15, wherein a power source for the charging event is a plug-in charging event.

* * * * *